United States Patent [19]

Hanlon

[11] Patent Number: 4,500,574
[45] Date of Patent: Feb. 19, 1985

[54] END CLOSURE FOR SAUSAGE CASINGS
[75] Inventor: Allan J. Hanlon, Stirling, Scotland
[73] Assignee: Devro, Inc., Somerville, N.J.
[21] Appl. No.: 463,767
[22] Filed: Feb. 4, 1983
[30] Foreign Application Priority Data
Feb. 9, 1982 [GB] United Kingdom ............... 8203687
[51] Int. Cl.³ ............................................... A22C 13/00
[52] U.S. Cl. .......................................... 428/35; 17/49;
138/109; 138/118.1
[58] Field of Search ................. 138/109, 118.1; 17/49;
428/35, 36

[56] References Cited
U.S. PATENT DOCUMENTS
2,111,273  3/1938  Becker ............................. 138/118.1
3,419,401  12/1968  Matecki ........................... 138/118.1
4,070,729  1/1978  Tums et al. ............................. 17/34

FOREIGN PATENT DOCUMENTS
1426355  2/1976  United Kingdom .
1563571  3/1980  United Kingdom .

Primary Examiner—John E. Kittle
Attorney, Agent, or Firm—Michael Q. Tatlow

[57] ABSTRACT

A strand of sausage casing is closed at one end by an end closure formed by coating the inner surface of an end portion with adhesive and crimping opposite sides together to form a seal, a restricted air passage being left through the seal. The strand is preferably a shirred strand of a thin-walled collagen sausage casing, the adhesive being collagen hydrolysate and the seal being heated during the crimping. A method of, and apparatus for, end-closing a strand of sausage casing are described.

2 Claims, 6 Drawing Figures

END CLOSURE FOR SAUSAGE CASINGS

The present invention relates to an end closure for sausage casings and more particularly to a strand of sausage casing having an end closure, and a method and apparatus for producing it.

Tubular food casings, particularly sausage casings, are supplied to sausage manufacturers in hollow strands, usually shirred strands, open at both ends. In order to manufacture a sausage product, individual shirred strands of casing are placed on stuffing horns and filled with the sausage emulsion. Prior to commencement of the filling it is necessary for an operator to manually un-shirr a short length of casing from the end of the shirred strand to effect a closure, or alternatively to hold it closed until sufficient sausage emulsion has been extruded into the end of the casing so as to prevent the flow of the sausage emulsion out of the casing. This manually performed operation considerably slows the sausage manufacturing procedure.

Automated machines have been developed for the stuffing and/or stuffing and linking of shirred sausage casings and the use of these machines, as for example that disclosed in the U.K. Patent Specification No. 1,563,571, can greatly increase the rate of sausage production. With the advent of such high speed automatic sausage stuffing machines, there is a need for a shirred casing strand having a closed end so that the strand can be placed, manually or automatically, on a stuffing horn and filled with sausage emulsion without further action on the part of the machine operator.

Attempts have been made to close the ends of strands of casing by various techniques, such as twisting, knotting, and heat sealing the casing material. U.S. Pat. No. 4,070,729, for example, discloses apparatus which twists the end of a shirred strand inwards onto a rod member inserted into the end of the strand so as to either form a completely closed end or leave a restricted aperture enabling air to escape during filling. In U.K. Patent Specification No. 1426355 the end portion of a strand of casing is compressed so as to leave a restricted aperture and is held in the compressed position by an adhesive.

However, it has been found that when the shirred casing is of thin-wall construction, e.g. edible collagen casing of wall thickness 18 $\mu$m to 25 $\mu$m, a number of problems can occur.

In some cases the closure that is formed has insufficient strength to prevent blowout of the end under pressure of the sausage emulsion. In other cases the closure formed allows a double thickness of casing material to be trapped between the stuffing horn and the control chuck or breaking ring during loading of the shirred strand. This usually results in casing rupture as it is subjected to the pressure of the sausage emulsion. Thirdly, the end seal may be of such integrity that there is no possibility that the pressure of the incoming sausage meat or entrapped air can be dissipated, resulting in casing rupture.

According to one aspect of the present invention we provide a strand of sausage casing closed at one end by an end-closure constituted by a crimped end portion of the strand in which opposite sides are adhesively secured together so as to form a partial seal having a restricted air passage therethrough.

By the use of an end-closed strand in accordance with the present invention the necessity for a manual end-closing operation is avoided, the end closure can penetrate "cleanly" the stuffing horn control chuck during the loading operation, and the closure has sufficient strength to withstand the pressure of the sausage emulsion which allowing dissipation of air pressure through the restricted air passage.

According to another aspect of the present invention we provide a method of end-closing a strand of sausage casing comprising coating an end portion of the strand on its inner surface with adhesive, inserting a spacer into the end portion, crimping the end portion so that opposite sides are adhesively secured together about the spacer, and withdrawing the spacer to leave a partial seal having a restricted air passage therethrough.

According to a further aspect of the present invention we provide apparatus for end-closing a strand of sausage casing comprising a pair of crimping jaws arranged to crimp together opposite sides of an end portion of the strand when closed, a spacer positionable through the jaws transverse to their direction of movement, and means for coating the inner surface of the end portion of the strand with adhesive prior to closing the jaws.

A strand of sausage casing having an end closure in accordance with the present invention and a method and apparatus for producing it will now be described by way of example and with reference to the accompanying drawings in which.

Figure 1:
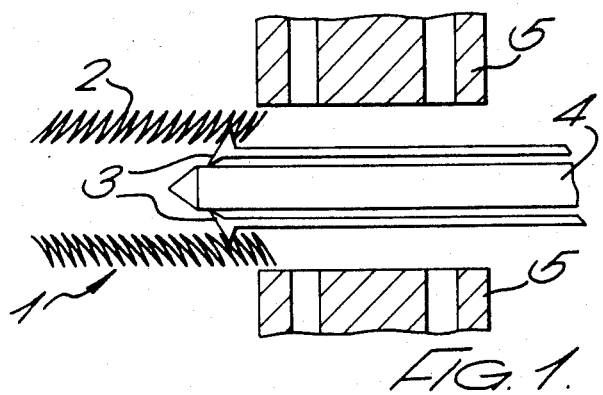
FIG. 1 is a side elevation, partly in section, of an open-ended shirred strand in the apparatus at the commencement of the end-closing method.

Referring to the drawings an open ended tubular strand 1 of sausage casing extruded from collagen has been shirred with a multitude of pleats 2 in a well known manner to give a shirred strand. The casing is thin-walled, for example with a wall thickness of approximately 17 $\mu$m to 25 $\mu$m and is typically approximately 20 mm in diameter.

In FIG. 1 the strand has been presented to the end closure apparatus with its open and over gripper jaws 3. The gripper jaws 3 are moveable radially with respect to the tubular strand between a retracted position in which the gripper jaws can pass freely into the open end of the strand and an expanded position, as shown in FIG. 1, in which they engage the wall of the strand. Cam surfaces on the front of a control rod 4 urge the gripper jaws 3 into the expanded position as the gripper jaws are moved away from the strand so that the end of the strand is caught and pulled out into a casing guide 5.

Figure 2:
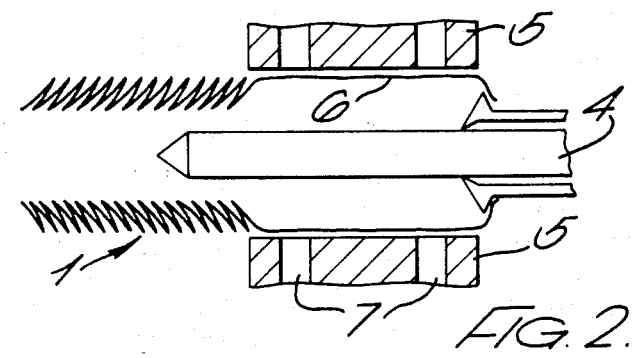
FIGS. 2 to 6 are side elevations corresponding to FIG. 1 showing successive further steps in the method.

As seen in FIG. 2 a length 6 of the strand is de-shirred by the gripper jaws. This length 6 is held against the casing guide 5 by applying a vacuum through passages 7 at the inner surface of the guide 5. With the length 6 of de-shirred strand held in position, the gripper jaws are moved to their retracted position by means of the control rod 4 and are removed.

Figure 3:
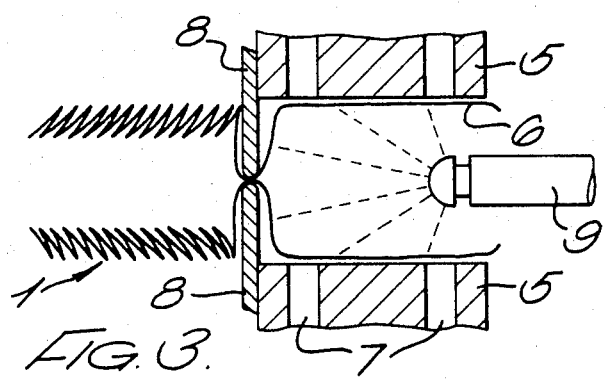
Figure 4:
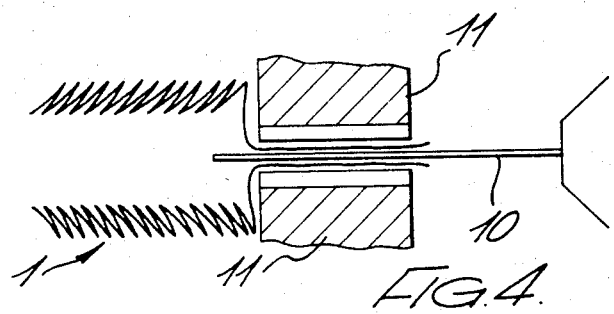
Figure 5:
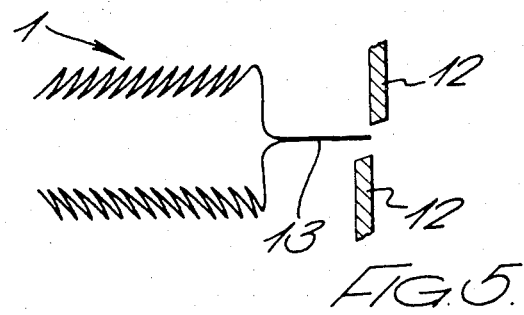
Figure 6:
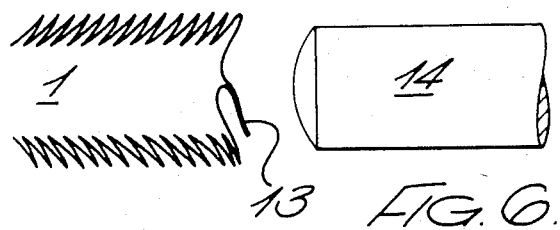

As seen in FIG. 3 clamps 8 are positioned next to the casing guide 5 and when closed they seal-off the de-shirred portion of the strand from the remainder of the strand. A spray head 9 can then be inserted into the de-shirred portion, the spray head being connected to a supply of collagen hydrolysate. Activation of the spray head 9 coats the inner surface of the de-shirred length 6 of the strand with a measured quantity of collagen hydrolysate, the clamps 8 preventing any spray from entering the rest of the strand and damaging it.

After spraying the clamps 8 are opened and the spray head 9 removed. A pin 10 is inserted into the open end of the strand and after releasing the length 6 from the casing guide 5 crimping jaws 11 are closed over it. The crimping jaws incorporate heating elements and are shaped to press the coated opposite sides of the strand together around the pin 10.

The jaws 11 apply heat at a temperature of 125° C. for a period of 2 seconds and then open, the pin 10 being then removed and the crimped section 13 cut to a length of approximately 0.5 cm by cutter blades 12.

Finally the crimped section 13 is folded over and pressed slightly into the end of the casing by a piston 14 having a domed end. The crimped section 13 does not protrude into the casing and in this position will not interfere at all with automatic loading and filling apparatus.

In the above procedure the collagen hydrolysate acts as an adhesive which, when the crimping jaws 11 apply pressure and heat, bonds the opposite sides of the casing together except where the pin 10 passes between them. This gives a strong enough closure to resist the pressure of sausage meat during filling while the restricted air passage left by the pin allows trapped air to escape but not sausage emulsion. The air passage also acts as a shock absorber to prevent rupture of the wall during the initial pressure surge of the sausage emulsion. By using different size pins this shock absorber action can be varied to withstand a variety of shock load conditions and the range of pin sizes may be from approximately 0.25 mm to 1 mm in diameter.

The method has been described with reference to a collagen casing and using collagen hydrolysate as adhesive. However the same general procedure may be used with other casing materials. Also other food gums may be used as adhesive, such as acacia gum, agar, carrageenan, alginates, cellulose ethers and, in particular, gelatins. The adhesive in each case being chosen to suit the casing material.

Since gelatin is a degraded collagen and collagen hydrolysate is a degraded gelatin, both these adhesives may be considered simply as forms of degraded collagen.

With some casing materials, or adhesives the heating step may not be necessary or desirable.

The steps in the method may be carried out at successive stations in an automatic machine of the rotary or linear type.

I claim:

1. A shirred strand of sausage casing closed at one end by an end-closure constituted by a crimped end portion of the strand which is deshirred to remove transverse folds and in which opposite sides of the casing are adhesively secured together around a removable pin so as to form a partial seal having a precisely sized restricted air passage having a diameter of from 0.25 to 1 mm therethrough.

2. A strand according to claim 1 wherein the crimped end portion lies against the end wall of the strand.

* * * * *